US006854269B2

(12) United States Patent
Hale

(10) Patent No.: US 6,854,269 B2
(45) Date of Patent: Feb. 15, 2005

(54) NOISE ATTENUATION IN A HYDRAULIC CIRCUIT

(75) Inventor: David C. Hale, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 10/200,321

(22) Filed: Jul. 23, 2002

(65) Prior Publication Data

US 2004/0016230 A1 Jan. 29, 2004

(51) Int. Cl.7 .................................................. F16D 31/02
(52) U.S. Cl. ............................ 60/417; 60/469; 417/540
(58) Field of Search .......................... 60/417, 418, 469; 138/30, 31; 417/540

(56) References Cited

U.S. PATENT DOCUMENTS 5,098,263 A * 3/1992 Hattori et al. .............. 417/540
5,435,699 A 7/1995 Thawani et al.
5,492,451 A 2/1996 Franz et al.
5,560,205 A 10/1996 Huebner
5,630,316 A * 5/1997 Itsuji et al. .................. 60/418
5,697,216 A 12/1997 Phillips
6,116,138 A 9/2000 Achten
6,119,802 A 9/2000 Puett, Jr.
6,234,758 B1 5/2001 Pawelski

* cited by examiner

*Primary Examiner*—F. Daniel Lopez
(74) *Attorney, Agent, or Firm*—Finnegan, Henderson, Farabow, Garrett & Dunner

(57) ABSTRACT

A method is provided for attenuating noise in a hydraulic circuit having a pump in fluid communication with a hydraulic actuator by a conduit. The method includes supplying a flow restricting device in the conduit and generating a signal representative of a fluid fluctuation in the conduit downstream of the flow restricting device. A bypass loop is provided in parallel with the flow restricting device and the bypass has a valve. The valve is controlled based on the generated signal to generate a corrective fluid flow to attenuate the noise.

19 Claims, 3 Drawing Sheets

NOISE ATTENUATION IN A HYDRAULIC CIRCUIT

TECHNICAL FIELD

The present invention is directed to a system and method for attenuating noise in a hydraulic circuit. More particularly, the invention relates to a system and method for attenuating noise in a hydraulic circuit by monitoring a fluid fluctuation.

BACKGROUND

The hydraulic system of a machine, such as, for example, an excavator or a loader, typically includes a pump and a hydraulic actuator in fluid communication. The hydraulic actuator may be a hydraulic cylinder, a hydraulic motor, or another device supplying motive power to a work implement or drive train of the machine. During the operation of the machine, pressurized hydraulic fluid flows from the pump to the hydraulic actuator to move a work element associated with the hydraulic actuator.

A pump generally includes a drive shaft, a rotatable cylinder barrel having multiple piston bores, pistons held against a tiltable swashplate, and a valve plate. When the swashplate is tilted relative to the longitudinal axis of the drive shaft, the pistons reciprocate within the piston bores to produce a pumping action. Each piston bore is subject to intake and discharge pressures during each revolution of the cylinder barrel.

In the above described pump, the total fluid flow from the pump is geometrically proportional to the sum of the displacement of the individual pistons between bottom dead center (BDC) and top dead center (TDC) positions of the pump. A pump generally has an odd number of pistons and piston bores in the cylinder barrel. When the pump has, for example, nine pistons and corresponding pistons bores, there may be five pistons pressurized at a certain rotational position of the cylinder barrel and four pistons pressurized at another rotational position. This difference in the number of the pressurized pistons in a revolution of the cylinder barrel results in flow and pressure variations in the fluid output of the pump.

The flow and pressure variations frequently create pump noise, also known as a ripple. The ripple becomes more prominent as pressure variation amplitude and frequency increase. Such pump-produced variations or ripples in pressure and flow are transmitted through the hydraulic fluid as fluid-borne noise to the hydraulic actuator and other components in the machine. The fluid-borne noise in turn becomes audible (air-borne) noise and is transmitted to the surrounding air as undesirable noise and vibrations. Moreover, the ripple can exert a stress on the hydraulic actuator and other components in the machine, thereby decreasing machine life.

These flow and pressure variations are not limited to pumps having an odd number of pistons. In a pump having an even number of pistons, the numbers of pressurized pistons also change as the barrel rotates, and this also results in flow and pressure variations. In addition to the above described causes of flow/pressure ripple, minor geometrical changes and port timing can contribute to flow and pressure variations. Thus, the pump structure, pumping frequency, harmonics, and other factors may create flow and pressure variations in the fluid transmitted from the pump to the hydraulic actuator.

Various attempts have been made to reduce noise in hydraulic systems. For example, U.S. Pat. No. 5,492,451 discloses an apparatus and method for attenuation of fluid-borne noise in a hydraulic system. The apparatus includes a mechanism for sensing a flow ripple produced by a pump and a negative flow ripple generator for reducing or eliminating the ripple. The negative flow ripple generator provides a corrective flow to the hydraulic system to cancel the flow ripple. The negative flow ripple generator uses a piston and a solid state motor to create a negative ripple and does not use pressurized fluid from the main system pump.

Also, U.S. Pat. No. 6,234,758 discloses a hydraulic noise reduction assembly having a variable volume side branch in a hydraulic system. The variable side branch includes a variable fluid container operable to change its volume based on a pump speed. A controller receives a pump speed signal and outputs a signal to vary the volume of the fluid container to attenuate fluid noise in the hydraulic system. To attenuate fluid noise with low frequency, the hydraulic noise reduction assembly may require a fluid container with a large volume capacity.

Thus, it is desirable to provide a system that effectively attenuates fluid-borne noise in a hydraulic system, is relatively inexpensive to manufacture, and is compact in size. The present invention is directed to solving one or more of the shortcomings associated with prior art designs.

SUMMARY OF THE INVENTION

In one aspect, a method is provided for attenuating noise in a hydraulic circuit having a pump in fluid communication with a hydraulic actuator by a conduit. The method includes supplying a flow restricting device in the conduit and generating a signal representative of a fluid fluctuation in the conduit downstream of the flow restricting device. A bypass loop is provided in parallel with the flow restricting device. The bypass loop has a valve. The valve is controlled based on the generated signal to generate a corrective fluid flow to attenuate the noise.

In another aspect, a system is provided for attenuating noise in a hydraulic circuit having a pump in fluid communication with a hydraulic actuator by a conduit. The system includes a sensor assembly coupled to the conduit and is configured to generate a signal representative of a fluid fluctuation in the hydraulic circuit. A bypass loop is connected in parallel with the conduit. The bypass loop has a valve. A controller is electrically coupled to the sensor assembly and is configured to control the valve based on the generated signal to attenuate the noise in the hydraulic circuit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
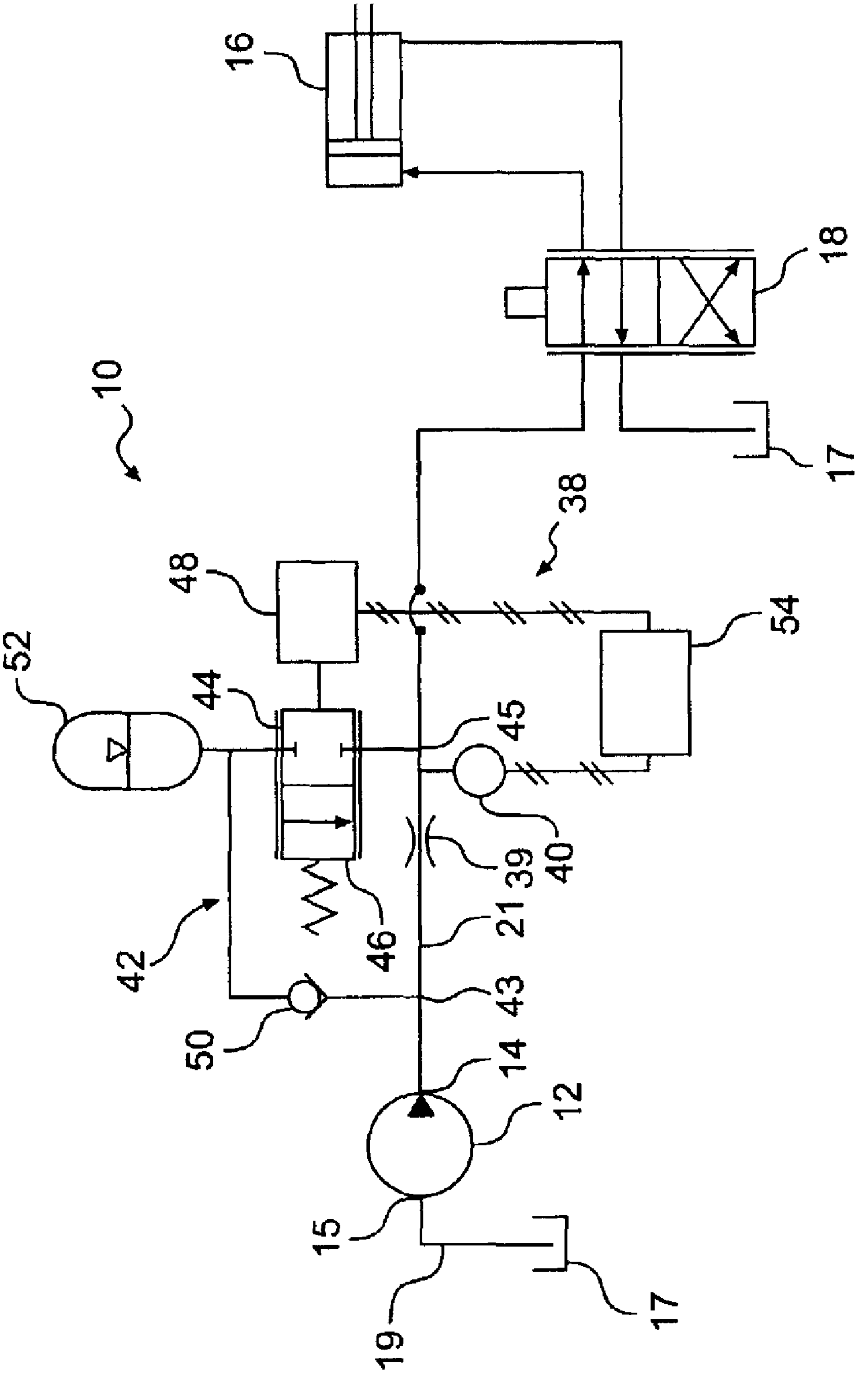
FIG. 1 is a schematic and diagrammatic representation of a hydraulic circuit including a system for attenuating noise according to one exemplary embodiment of the present invention.

FIG. 1 schematically and diagrammatically illustrates a hydraulic circuit including a system for attenuating noise according to one exemplary embodiment of the invention. A hydraulic circuit 10 shown in FIG. 1 may be a part of a machine, such as an excavator, a loader, or any other piece of equipment utilizing a hydraulic system. The hydraulic circuit 10 includes a pump 12 typically driven by an engine (not shown in FIG. 1), such as an internal combustion engine. Typically, the pump 12 includes a pump outlet port 14, a pump inlet port 15, a drive shaft, a rotatable cylinder barrel having multiple piston bores, and pistons held against a tiltable swashplate. The swashplate is tilted relative to the longitudinal axis of the drive shaft, and the pistons reciprocate within the piston bores to produce a pumping action. A reservoir 17 is in fluid communication with the pump inlet port 15 by a reservoir conduit 19 to supply necessary hydraulic fluid to the pump 12.

In the embodiment shown in FIG. 1, the hydraulic circuit 10 includes a hydraulic actuator 16, such as, for example, a double-acting cylinder and a control valve 18 disposed between the hydraulic actuator 16 and the pump 12. The double-acting cylinder may be a hydraulic cylinder or any other suitable implement device used for raising, lowering, or otherwise moving a portion of the machine. Though the embodiment is described with respect to a hydraulic cylinder, this invention is not limited to a cylinder, and the hydraulic circuit 10 may include a hydraulic motor or any other suitable hydraulic actuator. As illustrated in FIG. 1, the pump 12 is in fluid communication with the hydraulic actuator 16 via a conduit 21 and the control valve 18.

Figure 2C:
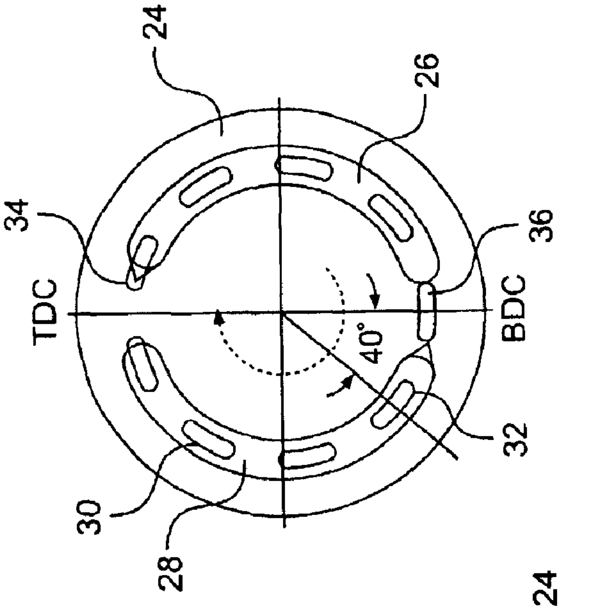
FIG. 2C is a diagrammatic representation of the valve face of FIG. 2A with the piston ports rotated 40 degrees.
Figure 2B:
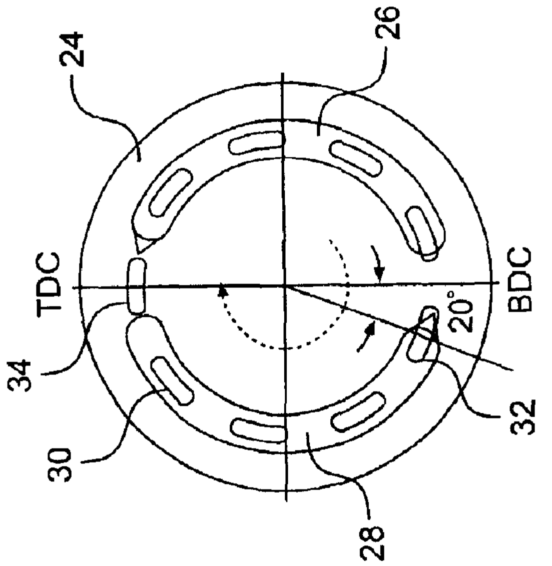
FIG. 2B is a diagrammatic representation of the valve face of FIG. 2A with the piston ports rotated 20 degrees and having a piston port at the TDC position.
Figure 2A:
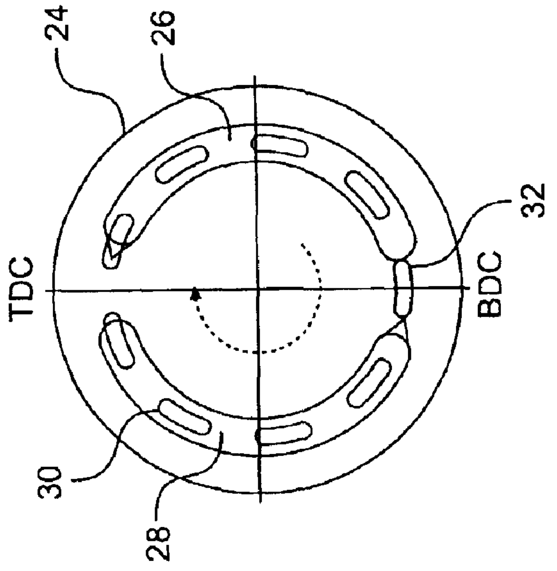
FIG. 2A is a diagrammatic representation of a valve face of a pump overlying a cylinder barrel and having a piston port at the BDC position.

FIGS. 2A–C illustrate a valve plate 24 of the pump 12 having, for example, nine pistons. The valve plate 24 has an elongated inlet passage 26 and an elongated outlet passage 28. The inlet passage 26 is in fluid communication with the reservoir 17 via the pump inlet port 15 and the reservoir conduit 19, and the outlet passages 28 is in fluid communication with the conduit 21 via the pump outlet port 14. The valve plate 24 overlays nine piston ports 30 and associated piston chambers provided in the cylinder barrel (not shown in FIGS. 2A–C). As is well known in the art, the piston ports 30 are equally spaced from one another and are disposed in the cylinder barrel and rotate relative to the inlet and outlet passages 26, 28 of the valve plate 24.

The valve plate 24 of the pump 12 has a BDC position and a TDC position. In FIG. 2A, a first piston port 32 is illustrated at the BDC position. At this position, the first piston port 32 is not in fluid communication with the inlet passage 26 or the outlet passage 28. The first port 32 in this position is filled with hydraulic fluid and is ready to discharge it into the outlet passage 28 and to the pump outlet port 14 as it continues to rotate clockwise.

In FIG. 2B, the piston ports 30 have rotated 20 degrees from the BDC position. At this position, a second piston port 34 of the nine piston ports 30 is at the TDC position. At this position, the second piston port 34 and associated piston chamber have had the maximum volume of hydraulic fluid discharged therefrom and are ready to receive the hydraulic fluid from the inlet passage 26 as the barrel rotates in a clockwise direction.

In FIG. 2C, the first piston port 32 is illustrated after being rotated 40 degrees from the BDC position illustrated in FIG. 2A. In this position, a third piston port 36 of the nine piston ports 30 is at the BDC position. In a pump having nine pistons ports, a different piston port is at the BDC position for every 40 degrees of rotation of the cylinder barrel. The total flow output of the pump is geometrically proportional to the sum of the velocities of the individual pistons between the BDC and TDC positions. Since the sum of the velocities of the pistons is not constant throughout each 40-degree of rotation of the cylinder barrel, the total flow produced and delivered to the outlet passage 28 is not constant, thus, resulting in pressure and flow fluctuations, or a ripple, in the discharged fluid from the pump 12.

Also, the effective number of pistons under pressure changes as the pistons rotate between the BDC and TDC positions, further adding to the ripple in the discharged fluid. Moreover, as each piston enters or leaves each of corresponding inlet and outlet passage, the pressure in the piston chamber changes from high to zero pressure at the TDC position and from the zero pressure to high at the BDC position. This occurs in a finite time and results in a ripple in the fluid discharged from the pump 12. Thus, the variation in flow during each 40-degree of rotation is a result of both the geometric variation of flow and the flow ripple caused by parting of the individual pistons making the transition from low to high and high to low pressure.

As shown in FIG. 1, the machine 10 includes a noise attenuating system 38. The noise attenuating system 38 includes a flow restricting device 39 in the conduit 21. The flow restricting device 39 divides the conduit 21 into upstream and downstream sections and creates a fluid pressure difference between the upstream and downstream of the device. The flow restricting device 39 may be an orifice or any other suitable device to create a suitable pressure drop downstream of the flow restricting device in the conduit 21.

As shown in the exemplary embodiment of FIG. 1, the noise attenuating system 38 includes a sensor assembly 40 to monitor a fluid fluctuation, such as pressure fluctuations and/or flow fluctuations, in the conduit 21. In one exemplary embodiment, the sensor assembly 40 may be a pressure sensor to monitor the pressure fluctuations in the fluid. Other examples of the sensor assembly 40 include a fluid flow sensor, an accelerometer, a strain gauge, and a microphone. However, the sensor assembly 40 is not limited to the above examples and can be any sensor assembly known to one skilled in the art to monitor the pressure or flow fluctuations in the fluid.

While FIG. 1 illustrates the sensor assembly 40 located at a particular location in the conduit 21, the location of the sensor assembly 40 of the present invention is not limited to that specific arrangement. The sensor assembly 40 can be placed at any location suitable to monitor a desired fluid fluctuation. One skilled in the art will appreciate the appropriate locations of the sensor assembly 40 to ascertain a desired fluid fluctuation.

The noise attenuating system 38 also includes a bypass loop 42 in fluid communication with the conduit 21. As shown in FIG. 1, the bypass loop 42 is in fluid communication with the conduit 21 at an inlet junction 43 and an outlet junction 45. During fluid flow, the fluid pressure at the inlet junction 43 is higher than the fluid pressure at the outlet junction 45 due to the flow restricting device 39. The outlet junction 45 would normally be located downstream in the conduit 21 with respect to the sensor assembly 40.

Referring to FIG. 1, the bypass loop 42 includes a proportional valve 44. In the exemplary embodiment in FIG. 1, the proportional valve 44 has a valve spool 46 with open and closed valve positions. In the closed valve position (shown in FIG. 1), the valve spool 46 does not allow the hydraulic fluid in the bypass loop 42 to flow through the proportional valve 44. In the open valve position, the spool valve 46 allows the hydraulic fluid to flow through the valve proportional 44. The valve spool 46 may be moved to a desired position between the open and closed positions to meter the hydraulic flow. The invention is not limited to two-position valves, and the proportional valve 44 can be any other suitable valve known to those skilled in the art.

The proportional valve 44 may be a low frequency valve (e.g., 20 to 40 Hz) having a slow open/close time or a high frequency valve (e.g., 150 to 200 Hz or more) having a quick open/close time in response to an valve actuation signal. In general, the low frequency valves are more economical than the high frequency valve.

The proportional valve 44 is coupled to a valve actuator 48 to move the valve spool 46 to a desired position to thereby control the hydraulic flow through the proportional valve 44. The displacement of the valve spool 46 changes the flow rate of the hydraulic fluid through the proportional valve 44. The valve actuator 48 may be a solenoid actuator or any other actuator known to those skilled in the art.

As shown in FIG. 1, the bypass loop 42 may also include a check valve 50 between the inlet junction 43 and the proportional valve 44. The check valve 50 allows the pressurized fluid from the conduit 21 to flow through it via the inlet junction 43 in one direction and prevents a reverse flow of the fluid in the bypass loop 42.

In one embodiment, the bypass loop 42 may also have a pressurized chamber or accumulator 52. The accumulator 52 may store the pressurized fluid and dampen the pressure fluctuations in the fluid in the bypass loop 42. Though the accumulator 52 is illustrated in the exemplary embodiment of FIG. 1, the invention is not limited to a use of an accumulator. For example, the bypass loop 42 may include a hose that dampens the fluid fluctuations in the bypass loop 42.

In another embodiment, in lieu of the bypass loop, a second pump may be provided in fluid communication with the valve 44 to provide necessary pressurized fluid.

As shown in FIG. 1, the noise attenuating system 38 includes a controller 54 electrically coupled to the sensor assembly 40 and the valve actuator 48. The controller 54 receives a fluid fluctuation signal from the sensor assembly 40 and sends a valve actuation signal to the valve actuator 48 to meter the valve 44. Based on the fluid fluctuation signal from the sensor assembly 40, the controller 54 determines the timing of and a corresponding valve actuation signal that is fed to the valve actuator 48.

Figure 3A:
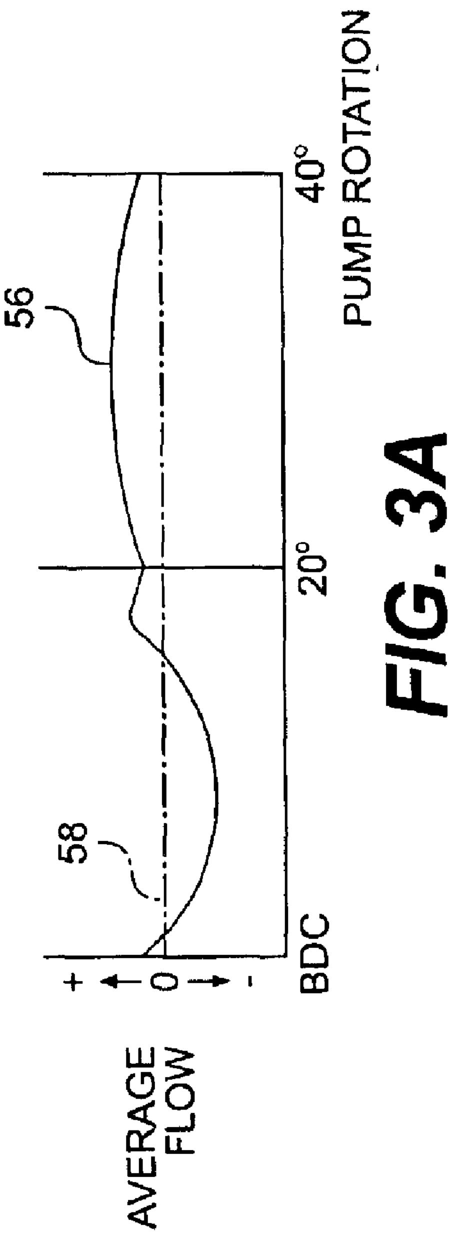
FIG. 3A is a diagrammatic chart illustrating exemplary average flow with flow fluctuations in fluid from a pump.

FIG. 3A illustrates an example of flow fluctuations 56 with respect to a partial pump rotation cycle while being operated under a loaded condition. As shown in FIG. 3A, the flow fluctuations in the conduit 21 may not be a constant shaped curve during the partial pump rotation cycle because the pump 12 may be operating under different system parameters such as different pump outlet pressures, speeds, and/or displacements. The variations in the fluid flow during each partial pump rotation cycle are a result of the above-described factors, including the geometric variation of the pump 12 and the ripple caused by porting of the individual pistons making the transition from low to high pressure. These flow fluctuations cause a fluid-borne noise. Rapid fluctuations in fluid flow from the individual pumping chambers cause an associated instantaneous fluctuation in pressure during the partial pump rotation cycle. The partial pump rotation cycle being the first 40-degree of rotation from the BDC position. These instantaneous pressure fluctuations are reverberated throughout the fluid system. FIG. 3A also illustrates an ideal constant flow line 58.

Figure 3B:
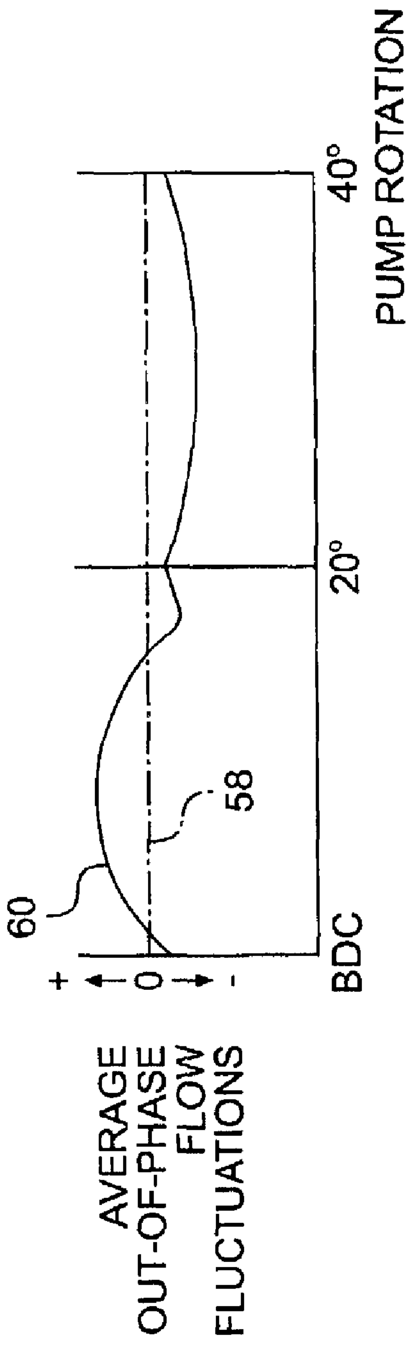
FIG. 3B is a diagrammatic chart illustrating corrective out-of-phase flow fluctuations according to one exemplary embodiment of the present invention.

FIG. 3B illustrates exemplary out-of-phase corrective flow fluctuations 60 generated by the noise attenuating system 38. The out-of-phase corrective flow fluctuations 60 are generated by controlling the valve 44 and are provided to the conduit 21 at the outlet junction 45. The out-of-phase corrective flow fluctuations 60 generated by the noise attenuating system 38 reduce or cancel the flow fluctuations 56 created by the pump 12. As shown in FIG. 3B, the out-of-phase corrective flow fluctuations 60 having a positive magnitude are generated to attenuate the negative flow fluctuations in the conduit 21. Such out-of-phase positive corrective flow fluctuations may not only attenuate the negative flow fluctuations, but also reduce the average flow fluctuations in the conduit 21. When the pressure fluctuations have a positive flow magnitude, the noise attenuating system 38 generates the out-of-phase corrective negative flow fluctuations by closing the proportional valve 44 and permitting flow to be directed into the by-pass loop and/or accumulator 52. The magnitude of the out-of-phase corrective flow fluctuations 60 varies according to the magnitude of the flow fluctuations 56 to be attenuated. The noise attenuating system 38 generates the out-of-phase corrective flow fluctuations 60 to offset the effect of the flow fluctuations 56 illustrated in FIG. 3A, thereby attenuating the flow fluctuations closer to the level of the desired constant flow line 58.

In one exemplary embodiment, the controller 54 may include a look-up table, map, or mathematical equations to determine the valve actuation signal to be fed to the valve actuator 48 that corresponds to the fluid fluctuation signal.

Industrial Applicability

Referring to FIG. 1, the sensor assembly 40 monitors a fluid fluctuation, such as pressure or flow fluctuations, in the hydraulic fluid from the pump 12. A fluid fluctuation signal that represents the monitored fluid fluctuation is then sent from the sensor assembly 40 to the controller 54, which is electrically coupled to the sensor assembly 40. A valve actuation signal determined from the monitored fluid fluctuation is then sent from the controller 54 to the valve actuator 48. Based on the valve actuation signal, the actuator 48 maintains the closed position or moves the valve spool 46 of the valve 44 to meter the fluid to generate the out-of-phase corrective flow fluctuations. The valve spool 46 may not need to be opened fully to generate the out-of-phase corrective positive flow fluctuations.

The present invention provides a noise attenuating system or method that utilizes its own system pressure/flow and effectively attenuates fluid-borne noise in a hydraulic system. Moreover, the system is relatively inexpensive to manufacture and implement, and is compact in size. The disclosed noise attenuating system and method can effectively attenuate undesired noise in a variety of hydraulic circuits and under a variety of conditions.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for attenuating fluid-born noise in a hydraulic circuit having a pump in fluid communication with a hydraulic actuator by a conduit, comprising:

supplying a flow restricting device in the conduit;

monitoring a fluid fluctuation in the hydraulic circuit;

generating a signal representative of the fluid fluctuation in the conduit downstream of the flow restricting device;

providing a bypass loop in parallel with the flow restricting device, the bypass loop having a valve; and controlling the valve based on the generated signal to generate a corrective fluid flow to attenuate the noise.

2. The method of claim 1, including supplying fluid from the pump to the valve through the bypass loop.

3. The method of claim 1, including providing a pressurized fluid storage device in fluid communication with the bypass loop.

4. The method of claim 1, wherein the valve is controlled in real time to attenuate the noise.

5. The method of claim 1, wherein the monitored fluid fluctuation is a pressure fluctuation in the hydraulic circuit.

6. The method of claim 1, wherein the valve is controlled under a low frequency response time.

7. The method of claim 1, wherein the generated corrective fluid flow includes an out-of-phase flow fluctuation with respect to the noise.

8. A system for attenuating noise in a hydraulic circuit having a pump in fluid communication with a hydraulic actuator by a conduit, the system comprising:

a sensor assembly coupled to the conduit, the sensor assembly being configured to monitor a fluid fluctuation in the hydraulic circuit and to generate a signal representative of the fluid fluctuation in the hydraulic circuit;

a bypass loop connected in parallel with the conduit, the bypass loop having a valve; and a controller electrically coupled to the sensor assembly and being configured to control the valve based on the generated signal to attenuate the noise in the hydraulic circuit.

9. The system of claim 8, wherein the valve is a low frequency valve.

10. The system of claim 8, wherein the sensor assembly includes a pressure sensor to sense a pressure fluctuation in the hydraulic circuit.

11. The system of claim 8, further including a flow restricting device in the conduit.

12. The system of claim 11, wherein the bypass loop is in fluid communication with the conduit at a first junction upstream of the flow restricting device and a second junction downstream of the flow restricting device.

13. The system of claim 12, wherein the bypass loop includes a check valve and a pressurized fluid storage device.

14. The system of claim 11, wherein the flow restricting device is an orifice.

15. The system of claim 8, wherein the valve is a solenoid actuated proportional valve coupled to the controller and modulates a fluid flow thereacross.

16. The system of claim 8, wherein the valve is controlled to generate a corrective fluid flow.

17. The system of claim 16, wherein the generated corrective fluid flow includes an out-of-phase flow fluctuation to attenuate the noise.

18. A machine, comprising:

a pump;

a hydraulic actuator in fluid communication with the pump by a conduit;

a flow restricting device disposed in the conduit between the pump and the hydraulic actuator;

a sensor coupled to the conduit, the sensor being configured to monitor a fluid fluctuation in the hydraulic circuit and to sense a signal representative of the fluid fluctuation in the hydraulic circuit;

a bypass loop in fluid communication with the conduit at a first junction upstream of the sensor and the flow restricting device and a second junction downstream of the sensor and the flow restricting device, the bypass loop having a valve; and a controller electrically coupled to the sensor, the controller being configured to control flow across the valve based on the generated signal.

19. The machine of claim 18, wherein the valve generates an out-of-phase corrective flow fluctuation.

* * * * *